US006958774B2

(12) United States Patent
Kuroiwa

(10) Patent No.: US 6,958,774 B2
(45) Date of Patent: Oct. 25, 2005

(54) ELECTRONIC CAMERA CAPABLE OF STORING LOSSLESS COMPRESSED DATA BASED ON A THRESHOLD VALUE

(75) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 824 days.

(21) Appl. No.: 10/045,058

(22) Filed: Jan. 15, 2002

(65) Prior Publication Data

US 2002/0097326 A1 Jul. 25, 2002

(30) Foreign Application Priority Data

Jan. 19, 2001 (JP) ............................ 2001-012064

(51) Int. Cl.[7] ................................................ H04N 5/76
(52) U.S. Cl. ................................ 348/231.1; 348/222.1
(58) Field of Search ........................ 348/207.99, 222.1, 348/231.99, 231.1, 231.2; 382/244–247; 386/109–112; 375/240, 240.01; 341/64–67

(56) References Cited

U.S. PATENT DOCUMENTS 5,764,374 A * 6/1998 Seroussi et al. ............ 382/244
2001/0002845 A1 * 6/2001 Tamashima ................. 348/220
2004/0146214 A1 * 7/2004 Marks ........................ 382/239

* cited by examiner

*Primary Examiner*—Tuan Ho
(74) *Attorney, Agent, or Firm*—Oliff & Berridge PLC

(57) ABSTRACT

An electronic camera according to the invention is provided with an imaging unit for generating image data by taking a subject image; a lossless compression unit for generating compressed data by performing substantial lossless compression on the image data; a compression judging unit for judging whether the amount of the losslessly compressed data exceeds a threshold value; and a recording unit for recording the image data uncompressed in a recording medium when the amount of the losslessly compressed data exceeds the threshold value, and for recording the compressed data in the recording unit when the amount does not. In the electronic camera, when the amount of data after lossless compression is unexpectedly large, uncompressed data having a generally stable amount of data is recorded instead of compressed data. This can avoid accidents where shooting results cannot be recorded due to unexpectedly large amount of compressed data.

5 Claims, 3 Drawing Sheets

ELECTRONIC CAMERA CAPABLE OF STORING LOSSLESS COMPRESSED DATA BASED ON A THRESHOLD VALUE

BACKGROUND OF THE INVENTION

1. Field of the Invention

The present invention relates to an electronic camera that generates image data by taking a subject image and stores the image data in a recording medium.

2. Description of the Related Art

Conventionally, electronic cameras are known that perform fixed-length compression (i.e., compression that produces compressed files having approximately constant data amounts) on image data and store the compressed data in a recording medium. Such fixed-length compression has an advantage that the number of remaining frames of the recording medium can be managed correctly and easily.

Incidentally, in such fixed-length compression, to suppress data amounts to approximately constant values, quantization scale enlargement, bit stream cutoff, etc. are performed at the stage of compression processing. In these kinds of processing, part of image information is deleted in such a degree that the deletion is not visually noticeable.

However, particularly for purposes in which high image quality is required (e.g., an image is processed for plate making or an enlarged image is displayed), the deletion of part of image information is problematic.

In view of this, there are some electronic cameras that perform lossless compression on image data and record compressed data. For example, DPCM (differential pulse code modulation) is known as such lossless compression. In the DPCM, differences are taken between pixels adjacent to each other for each of color components (e.g., R, G, and B) and Huffman coding is performed on the resulting difference data.

Further, there are some electronic cameras that perform approximate lossless compression on image data and record the compressed data. Compression in which preprocessing is performed on image data prior to image compression to increase the compression efficiency is known as an example of such approximate lossless compression. Image data loses a slight amount of information during the course of the preprocessing.

Incidentally, above kinds of lossless compression (including approximate lossless compression; this also applies to the following description) are variable-length compression in which the amount of compressed data varies. Therefore, the lossless compression has a problem that the management of the number of remaining frames of a recording medium is difficult.

In particular, there is a problem that when the amount of losslessly compressed data exceeds a remaining capacity by an unexpectedly large amount in a state that the number of remaining frames is equal to "1", image data obtained by shooting cannot be stored in a recording medium.

In the case of an electronic camera having a rapid shooting buffer memory, the same problem arises even when the number of remaining frames is larger than "1". At the time of sequential shooting, such an electronic camera stores image data of a plurality of frames in order in the buffer memory. There is a problem that not all of the image data cannot be stored in a recording medium when the total amount of compressed data of the image data stored in the buffer memory exceeds a remaining capacity by an unexpectedly large amount.

In particular, a user's selection of lossless compression means that the shooting is most important to the user. Therefore, in such a case, it is necessary to avoid, to the utmost, an accident that a shooting result cannot be stored.

SUMMARY OF THE INVENTION

An object of the present invention is to make improvements in avoiding situations where a shooting result cannot be stored in an electronic camera that performs lossless recording.

The invention will be described below.

(1) An electronic camera according to the invention comprises an imaging unit for generating image data by taking a subject image; a lossless compression unit for generating compressed data by performing substantial lossless compression on the image data generated by the imaging unit; a compression judging unit for judging whether an amount of the compressed data exceeds a predetermined threshold value; and a recording unit for recording the image data uncompressed in a recording medium when the amount of the compressed data exceeds the threshold value, and for recording the compressed data in the recording unit when the amount does not.

The electronic camera having this configuration attempts to record uncompressed data (uncompressed image data) instead of compressed data when the amount of data after performing lossless compression exceeds the predetermined threshold value.

The uncompressed data has an amount that can be predicted from image parameters such as a resolution, and the amount is generally stable. Therefore, this uncompressed data can be recorded more reliably in the recording medium than a compressed whose data amount has unexpectedly increased. In the electronic camera that performs lossless recording, this makes it possible to make improvements in avoiding accidents where shooting results cannot be stored.

Preferable manners in managing the number of remaining frames will be described below, according to each setting of the threshold values.

First, in the invention, the above-mentioned threshold value can be set greater than the amount of uncompressed data. In this case, the data amount never exceeds the threshold value, whether compressed data is recorded, or uncompressed data is recorded. Therefore, managing the number of remaining frames can be performed without fail by evaluating the remaining capacity of the recording medium using the threshold value as a reference.

Conversely, in the invention, the above-mentioned threshold value can be set smaller than the amount of uncompressed data. In this case, the data amount never exceeds the amount of uncompressed data, whether compressed data is recorded, or the uncompressed data is recorded. Therefore, managing the number of remaining frames can be performed without fail by evaluating the remaining capacity of the recording medium using the amount of uncompressed data as a reference.

As described above, with either of the above settings, managing the number of remaining frames can be performed easily without fail.

(2) Another electronic camera according to the invention is characterized by comprising, in addition to the components of the electronic camera according to the above item (1), a remaining capacity determining unit for judging magnitude of a remaining capacity or the number of remaining frames of the recording medium, and for judging whether the remaining capacity has a margin, and it is further characterized in that the recording unit records the compressed data in the recording medium irrespective of the amount of the compressed data when the remaining capacity determining unit has judged that the remaining capacity of the recording medium has a margin.

Usually, as long as the remaining capacity of a recording medium has a margin, a situation that the compressed data cannot be recorded in the recording medium can always be avoided, even when the amount of compressed data is unexpectedly large. In view of this, in this electronic camera, compressed data is recorded in the recording medium unconditionally when it is judged that the remaining capacity of the recording medium has a margin. Therefore, the advantages of the invention can be obtained upon necessity in a critical, emergent situation that it is uncertain whether an image can be recorded in the recording medium.

In this electronic camera, compressed data can be recorded as it is in the recording medium, in most cases excluding such emergent situations. Therefore, in most cases, measures for increasing processing speed can be taken, such as recording compressed data in the recording medium in order in parallel with lossless compression.

In the invention, it is preferable that the remaining capacity determining unit makes criterion for determining the remaining capacity severer during sequential shooting (or rapid shooting) of the electronic camera. In this case, in sequential shooting, the judgment that there is no sufficient margin in the remaining capacity is made at an early stage. This makes it possible to start, at an earlier stage, any operations to handle a situation that the amount of compressed data has become unexpectedly large. This therefore makes it possible to safely and surely avoid situations that the image data of a plurality of frames cannot be stored in the recording medium.

(3) Still another electronic camera according to the invention is based on the electronic camera according to the above item (1) and is characterized in that the threshold value is an amount of data that is needed in recording the image data uncompressed.

In this electronic camera, the threshold value is set at the amount of uncompressed data. As a result, the electronic camera records in the recording medium either compressed data or uncompressed data, whichever has a smaller amount of data. This makes it possible to use the recording capacity of a recording medium efficiently in electronic cameras that perform lossless compressions.

(For reference's sake, the phenomenon that the amount of losslessly compressed data is larger than that of uncompressed data rarely occurs. For example, such a phenomenon tends to occur in the case where a Huffman coding table or the like is not suitable for image data.)

(4) Yet another electronic camera according to the invention is characterized by comprising, in addition to the components of the electronic camera according to the above item (1), a remaining-frames managing unit for calculating, as the number of remaining frames, a quotient by dividing a remaining capacity of the recording medium by the threshold value, and for judging whether shooting can be continued according to the number of remaining frames.

In this electronic camera, a quotient is calculated as the number of remaining frames by dividing a remaining capacity of the recording medium by the threshold value, and whether the shooting can be continued is judged according to the calculated number of remaining frames. This operation makes it possible to properly judge whether or not the shooting can be continued.

(5) A further electronic camera according to the invention is characterized by comprising, in addition to the components of the electronic camera according to the above item (4), a buffer memory for temporarily storing a plurality of image data generated by the imaging unit, and it is further characterized in that the remaining-frames managing unit calculates, as the number of rapid-shooting-possible frames, a quotient by dividing a remaining capacity of the buffer memory by the amount of the image data and judges whether shooting can be continued according to a smaller number of the number of remaining frames and the number of rapid-shootable frames.

In this electronic camera, a quotient is calculated as the number of rapid-shootable frames by dividing the remaining capacity of the buffer memory by the amount of image data, and whether the shooting can be continued is judged according to either the number of remaining frames or the number of rapid-shootable frames, whichever is smaller. During sequential shooting (or rapid shooting), this operation makes it possible to properly judge whether the shooting can be continued or not.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

An embodiment of the present invention will be hereinafter described with reference to the drawings.

[Configuration of the Embodiment]

Figure 1:
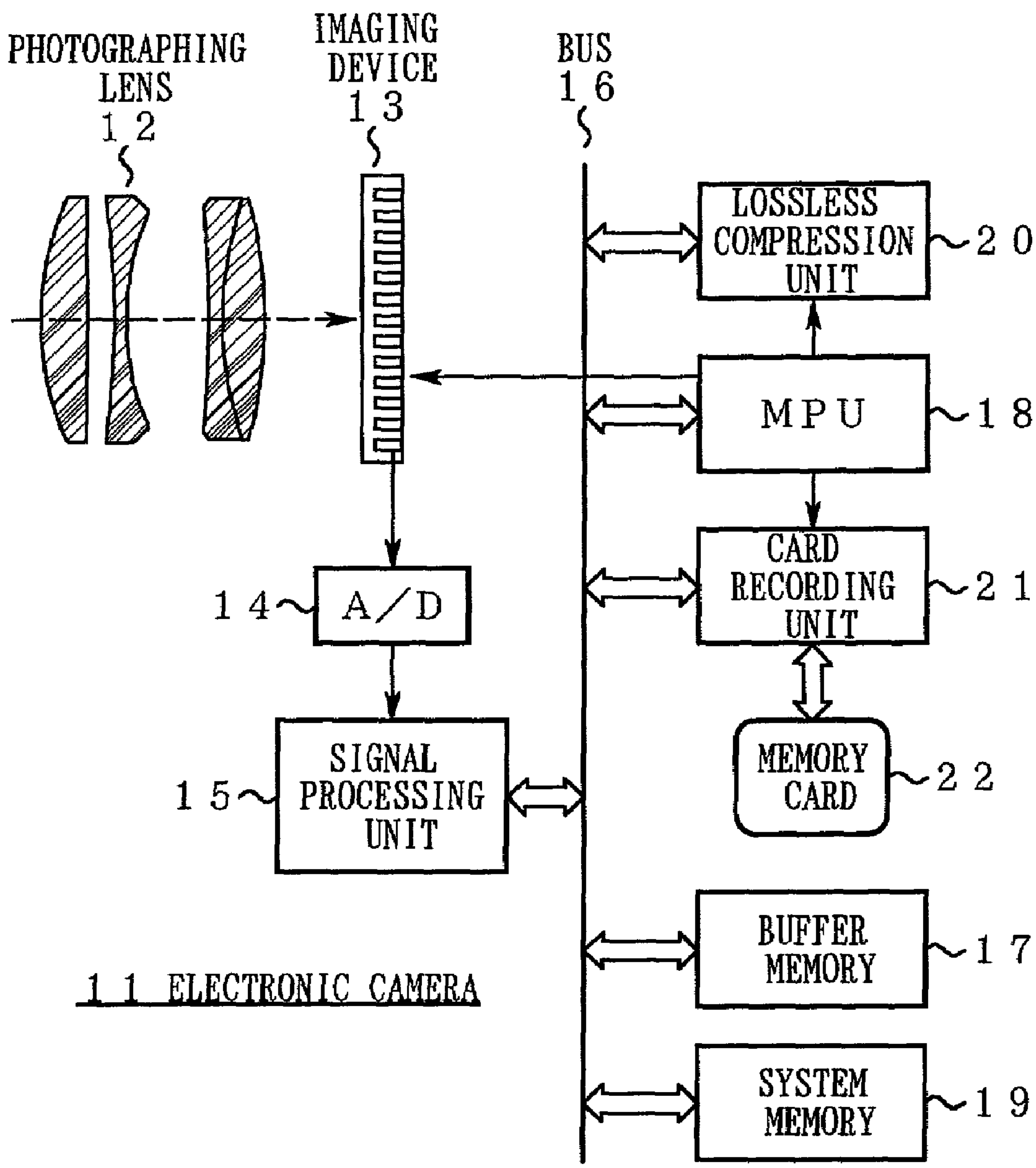
FIG. 1 shows an electronic camera 11 according to the embodiment.

FIG. 1 shows an electronic camera 11 according to the embodiment.

As shown in FIG. 1, the electronic camera 11 is mounted with a photographing lens 12. The imaging surface of an imaging device 13 is disposed in the image space of the photographing lens 12. Image data that is output from the imaging device 13 is digitized by an A/D conversion unit 14 and then supplied to a signal processing unit 15.

The signal processing unit 15 performs signal processing (gamma correction, black level correction, etc.) on the image data, and stores the resulting image data in a buffer memory 17 via a bus 16 for its temporary storage. The signal processing unit 15 thereafter performs two-dimensional image processing such as color interpolation on the image data stored in the buffer memory 17.

An MPU (microprocessor) 18 for system control, a system memory 19, a lossless compression unit 20 for generating compressed data by performing lossless compression on image data, and a card recording unit 21 are also connected to the bus 16. A memory card 22 is connected to the card recording unit 21 in a detachable manner.

It is possible to integrate the buffer memory 17 and the system memory 19 into a single memory. In this case, a storage capacity that can be used as that of the buffer memory is the total storage capacity of the memory minus the capacity of the system memory.

Lossless compression may be realized by using software compression by the MPU 18 instead of providing the dedicated lossless compression unit 20.

[Corresponding Relationship with the Invention]

A corresponding relationship with the invention will be described below. This corresponding relationship is just an example according to one interpretation and is intended for reference only, and should not be used for restricting the invention unduly.

The imaging unit in the claims corresponds to the photographing lens 12 and the imaging device 13.

The lossless compression unit in the claims corresponds to the lossless compression unit 20.

The compression judging unit in the claims corresponds to a function of the MPU 18 of judging whether the amount of compressed data exceeds a threshold value.

The recording unit in the claims corresponds to the card recording unit 21 and a function of the MPU 18 of switching, as appropriate, data to be recorded in the memory card 22.

The remaining capacity determining unit in the claims corresponds to a function of the MPU 18 of judging whether the remaining capacity of the memory card 22 has a margin.

The remaining-frames managing unit in the claims corresponds to a function of the MPU 18 of estimating the number of remaining frames of the memory card 22 and judging whether shooting can be continued.

The buffer memory in the claims corresponds to the buffer memory 17.

[Explanation of the Operation of Single Shooting]

Figure 2:
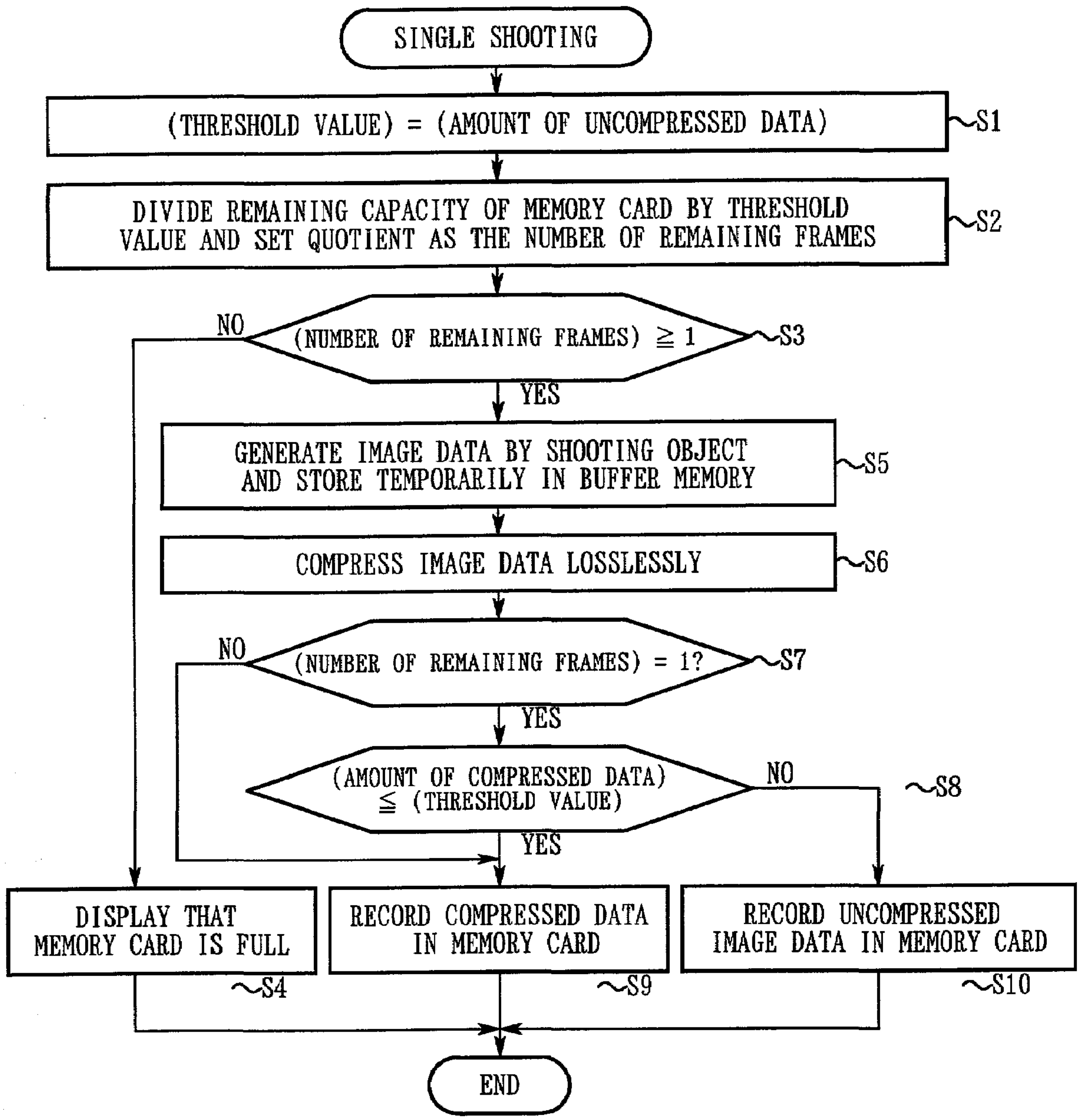
FIG. 2 is a flowchart showing a single shooting operation.

FIG. 2 is a flowchart showing a single shooting operation of the electronic camera 11. The single shooting operation will be described below in order of step numbers shown in FIG. 2.

[Step S1] First, the MPU 18 acquires an image resolution setting for recording from the system memory 19 or the like. Based on this image resolution, the MPU 18 calculates a data amount that will occur when image data is subjected to non-compression recording. The MPU 18 sets this data amount as a threshold value.

[Step S2] The MPU 18 acquires a remaining capacity of the memory card 22 from the card recording unit 21. The MPU 18 calculates a quotient by dividing the remaining capacity by the threshold value, and sets the quotient as the number of remaining frames.

[Step S3] The MPU 18 judges whether the number of remaining frames is larger than or equal to "1".

When the number of remaining frames is larger than or equal to "1", the MPU 18 judges that the shooting can be continued and makes a transition to step S5.

On the other hand, when the number of remaining frames is smaller than "1", the MPU 18 judges that the shooting can not be continued and makes a transition to step S4.

[Step S4] The MPU 18 makes, on the display screen (not shown) of the electronic camera 11, a display to the effect that the memory card 22 is full and stops the single shooting operation.

[Step S5] On the other hand, when the number of remaining frames is larger than or equal to "1", the MPU 18 controls the imaging device 13 and causes it to shoot an object. Image data that is output from the imaging device 13 is stored in the buffer memory 17 after completion of processing by the A/D conversion unit 14 and the signal processing unit 15.

[Step S6] The MPU 18 instructs the lossless compression unit 20 to perform lossless compression on the image data. The lossless compression unit 20 losslessly compresses the image data stored in the buffer memory 17 and stores the generated image data in the system memory 19 for its temporary storage.

[Step S7] The MPU 18 judges whether the number of remaining frames is equal to "1".

When the number of remaining frames is not equal to "1", the MPU 18 judges that the remaining capacity of the memory card 22 has a margin and makes a transition to step S9.

On the other hand, when the number of remaining frames is equal to "1", the MPU 18 judges that the remaining capacity of the memory card 22 does not have an enough margin and makes a transition to step S8.

[Step S8] The MPU 18 compares the amount of compressed data with the threshold value.

When the amount of compressed data is smaller than or equal to the threshold value, the MPU 18 makes a transition to step S9.

On the other hand, when the amount of compressed data is larger than the threshold value, the MPU 18 makes a transition to step S10.

[Step S9] The MPU 18 transfers the compressed data stored in the system memory 19 to the card recording unit 21. The card recording unit 21 records the compressed data in the memory card 22 in the form of an image file. After this recording operation, the MPU 18 finishes the single shooting operation.

[Step S10] At this step, the amount of compressed data should be larger than the threshold value. Such a case is very rare and may occur when a Huffman coding table or the like of lossless compression is not suitable for image data.

In this case, the MPU 18 transfers the uncompressed data (uncompressed image data) remaining in the buffer memory 17 to the card recording unit 21. The card recording unit 21 records this uncompressed data in the memory card 22 in the form of an image file.

After this recording operation, the MPU 18 finishes the single shooting operation.

[Explanation of Sequential Shooting]

Figure 3:
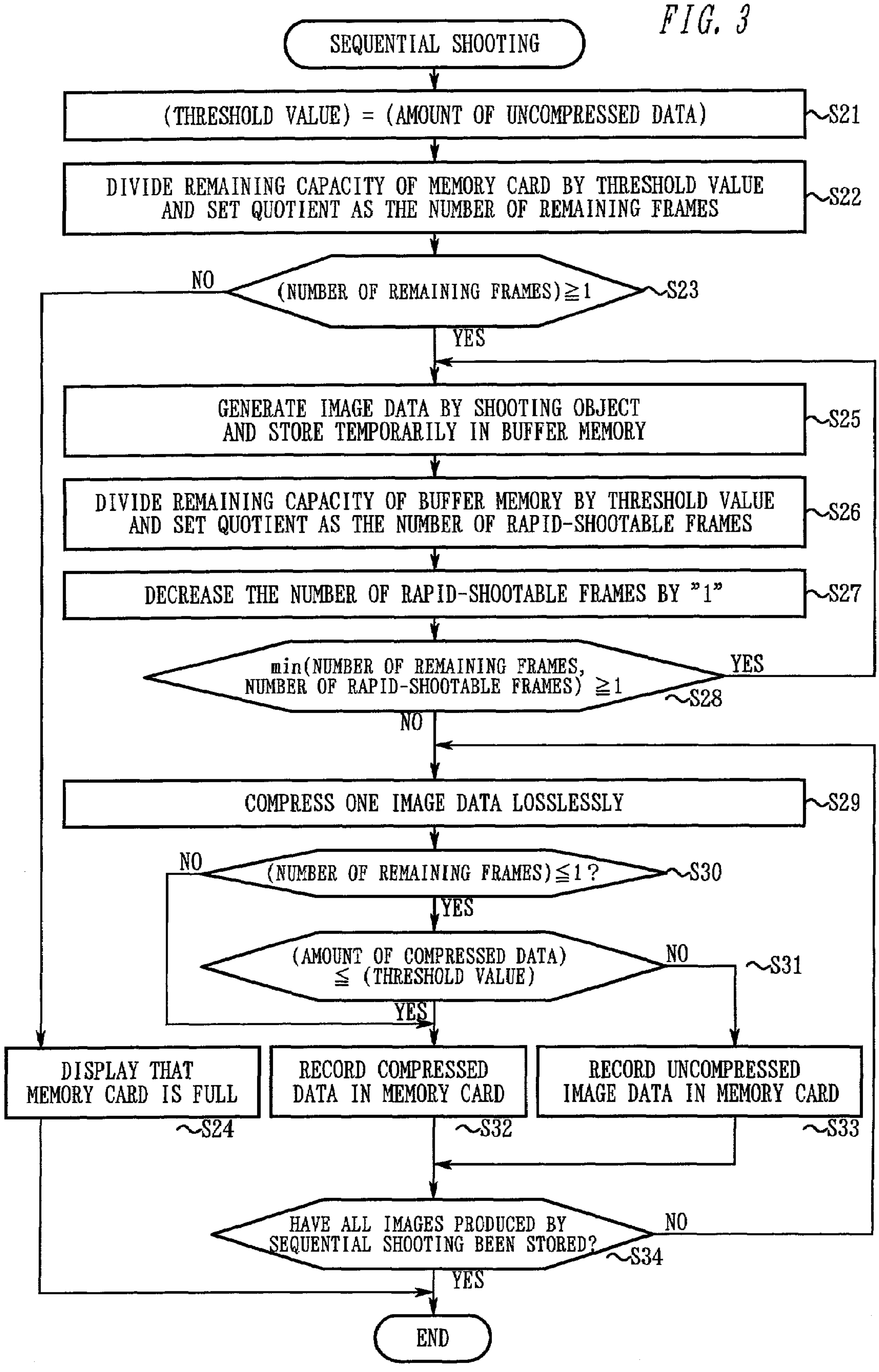
FIG. 3 is a flowchart showing a sequential shooting operation.

FIG. 3 is a flowchart showing a sequential shooting operation of the electronic camera 11. The sequential shooting operation will be described below in order of step numbers shown in FIG. 3.

[Step S21] First, the MPU 18 acquires an image resolution setting for recording from the system memory 19 or the like. Based on this image resolution, the MPU 18 calculates a data amount that will occur when image data is subjected to non-compression recording. The MPU 18 sets this data amount as a threshold value.

[Step S22] The MPU 18 acquires a remaining capacity of the memory card 22. The MPU 18 calculates a quotient by dividing the remaining capacity by the threshold value, and sets the quotient as the number of remaining frames.

[Step S23] The MPU 18 judges whether the number of remaining frames is larger than or equal to "1".

When the number of remaining frames is larger than or equal to "1", the MPU 18 judges that the shooting can be continued and makes a transition to step S25.

On the other hand, when the number of remaining frames is smaller than "1", the MPU 18 judges that the shooting can not be continued and makes a transition to step S24.

[Step S24] The MPU 18 makes, on the display screen (not shown) of the electronic camera 11, a display to the effect that the memory card 22 is full and stops the sequential shooting operation.

[Step S25] The MPU 18 controls the imaging device 13 and causes it to shoot an object. Image data that is output from the imaging device 13 is stored in the buffer memory 17 after completion of processing by the A/D conversion unit 14 and the signal processing unit 15.

[Step S26] The MPU 18 acquires a remaining capacity of the buffer memory 17. The MPU 18 calculates a quotient by dividing the remaining capacity by the threshold value, and sets the quotient as the number of rapid-shootable frames.

[Step S27] The MPU 18 decreases the number of remaining frames by one because the one-frame shooting operation was performed at step S25.

[Step S28] The MPU 18 chooses a smaller one of the number of remaining frames and the number of rapid-shootable frames. The MPU 18 judges whether the chosen value is greater than or equal to "1".

When the chosen value is greater than or equal to "1", the MPU 18 judges that the shooting can be continued and returns the process to step S25.

On the other hand, when chosen value is smaller than "1", the MPU 18 judges that the shooting can not be continued and makes a transition to step S29.

[Step S29] The MPU 18 instructs the lossless compression unit 20 to perform lossless compression on the image data. The lossless compression unit 20 losslessly compresses the one image data stored in the buffer memory 17. Image data that is generated at this time is stored in the system memory 19 for its temporary storage.

[Step S30] The MPU 18 judges whether the number of remaining frames is smaller than or equal to "1".

When the number of remaining frames is smaller than or equal to "1", the MPU 18 judges that the remaining capacity of the memory card 22 does not have an enough margin and makes a transition to step S31.

On the other hand, when the number of remaining frames is larger than "1", the MPU judges that the remaining capacity of the memory card 22 has a margin and makes a transition to step S32.

[Step S31] The MPU 18 compares the amount of compressed data with the threshold value.

When the amount of compressed data is smaller than or equal to the threshold value, the MPU 18 makes a transition to step S32.

On the other hand, when the amount of compressed data is larger than the threshold value, the MPU 18 makes a transition to step S33.

[Step S32] The MPU 18 transfers the compressed data stored in the system memory 19 to the card recording unit 21. The card recording unit 21 records the compressed data in the memory card 22 in the form of an image file. After this recording operation, the MPU 18 makes a transition to step S34.

[Step S33] At this step, the amount of compressed data should be larger than the threshold value. In this case, the MPU 18 transfers the uncompressed data (uncompressed image data) remaining in the buffer memory 17 to the card recording unit 21. The card recording unit 21 records this uncompressed data in the memory card 22 in the form of an image file. After this recording operation, the MPU 18 makes a transition to step S34.

[Step S34] The MPU 18 judges whether all images that have been produced by the sequential shooting have been stored.

When not all images have been stored, the MPU 18 makes returns the process to step S29.

On the other hand, when all images have been stored, the MPU 18 finishes the sequential shooting operation.

[Advantages and etc. of the Embodiment]

In the embodiment, uncompressed data is recorded in the memory card 22 immediately to cope with the occurrence of a situation that a data amount after performance of lossless compression has become unexpectedly large. The uncompressed data has a stable data amount that can be predicted from an image resolution, the number of gradations, the number of colors, etc. (except for a variation width of associated information codes). Therefore, by performing shooting after confirming that the remaining capacity of the memory card 22 is larger than the amount of uncompressed data, an accident that a shooting result cannot be stored in the memory card 22 can be avoided reliably.

In the embodiment, when the remaining capacity of the memory card 22 has a margin, compressed data is recorded in the memory card 22 without exception. Therefore, measures for increasing processing speed such as recording compressed data in the memory card 22 in order in parallel with lossless compression can be taken when necessary with an assumption that the compressed data are recorded in the memory card 22.

Further, in the embodiment, the remaining capacity judgment criterion is made severer as the number of frames of sequential shooting increases (steps S27 and S30). Since a transition to a safer operation (steps S31–S33) is made at an early stage, an accident that image data of sequential shooting cannot be stored in the memory card 22 can be avoided more reliably.

In this embodiment, whether shooting can be continued is judged according to a smaller one of the number of remaining frames and the number of rapid-shootable frames. Therefore, at the time of sequential shooting, whether shooting can be continued can be judged correctly.

[Supplements to the Embodiment]

In the above embodiment, an amount of compressed data is determined after performance of lossless compression. However, the invention is not limited to such a case. For example, the MPU 18 (compression judging unit) may judge (infer) whether the amount of compressed data will exceed a prescribed amount according to an interim result of lossless compression. In this case, the lossless compression unit 20 can stop useless lossless compression according to an inference result that the amount of compressed data will exceed the prescribed amount. As a result, the load of processing of the electronic camera 11 can be reduced and image storing processing can be completed quickly.

In the above embodiment, the threshold value is set at an amount of uncompressed data. However, the invention is not limited to such a case.

For example, the threshold value may be set at a value smaller than an amount of uncompressed data. With this setting, when compressed data and uncompressed data have similar data amounts, the uncompressed data is recorded preferentially. This provides an advantage that at the time of reproduction of an image a reproduction operation can be sped up by eliminating expansion processing.

For example, the threshold value may be set at a remaining capacity of a recording medium. With this setting, when a data amount after lossless compression exceeds a remaining capacity of the recording medium, the electronic camera 11 abandons recording of compressed data that is found impossible and attempts to record uncompressed data. This increases the probability that a shooting result can be stored.

The invention is not limited to the above embodiments and various modifications may be made without departing from the spirit and scope of the invention. Any improvement may be made in part or all of the components.

What is claimed is:

1. An electronic camera comprising:

an imaging unit for generating image data by taking a subject image;

a lossless compression unit for generating compressed data by performing substantial lossless compression on the image data generated by the imaging unit;

a compression judging unit for judging whether an amount of the compressed data exceeds a predetermined threshold value; and a recording unit for recording the image data uncompressed in a recording medium when the amount of the compressed data exceeds the threshold value, and for recording the compressed data in the recording unit when the amount does not.

2. The electronic camera according to claim 1, further comprising a remaining capacity determining unit for judging magnitude of a remaining capacity or the number of remaining frames of the recording medium, and for judging whether the remaining capacity has a margin, and wherein said recording unit records said compressed data in the recording medium irrespective of the amount of the compressed data, when the remaining capacity determining unit has judged that the remaining capacity of the recording medium has a margin.

3. The electronic camera according to claim 1, wherein said threshold value is an amount of data needed in recording the image data uncompressed.

4. The electronic camera according to claim 1, further comprising a remaining-frames managing unit for calculating, as the number of remaining frames, a quotient by dividing a remaining capacity of the recording medium by the threshold value, and for judging whether shooting can be continued according to the number of remaining frames.

5. The electronic camera according to claim 4, further comprising a buffer memory for temporarily storing a plurality of said image data generated by the imaging unit, wherein said remaining-frames managing unit calculates, as the number of rapid-shooting-possible frames, a quotient by dividing a remaining capacity of the buffer memory by the amount of the image data and judges whether shooting can be continued according to a smaller number of the number of remaining frames and the number of rapid-shootable frames.

* * * * *